US012613407B2

(12) United States Patent
Zhou et al.

(10) Patent No.: US 12,613,407 B2
(45) Date of Patent: Apr. 28, 2026

(54) REFLECTIVE DISPLAY DEVICE AND COLOR LAMINATED DISPLAY DEVICE

(71) Applicants: SOUTH CHINA NORMAL UNIVERSITY, Guangzhou (CN); SHENZHEN GUOHUA OPTOELECTRONICS CO., LTD., Shenzhen (CN)

(72) Inventors: Guofu Zhou, Guangzhou (CN); Biao Tang, Guangzhou (CN); Yongfeng Huang, Guangzhou (CN); Heyong Hu, Guangzhou (CN); Dong Yuan, Guangzhou (CN)

(73) Assignees: SOUTH CHINA NORMAL UNIVERSITY, Guangdong (CN); SHENZHEN GUOHUA OPTOELECTRONICS CO., LTD., Shenzhen (CN)

( * ) Notice: Subject to any disclaimer, the term of this patent is extended or adjusted under 35 U.S.C. 154(b) by 274 days.

(21) Appl. No.: 18/693,666

(22) PCT Filed: Nov. 28, 2023

(86) PCT No.: PCT/CN2023/134673
§ 371 (c)(1),
(2) Date: Mar. 20, 2024

(87) PCT Pub. No.: WO2024/179081
PCT Pub. Date: Sep. 6, 2024

(65) Prior Publication Data
US 2025/0138299 A1 May 1, 2025

(30) Foreign Application Priority Data
Mar. 2, 2023 (CN) .......................... 202310189491.8

(51) Int. Cl.
*G02B 26/00* (2006.01)

(52) U.S. Cl.
CPC ................................... *G02B 26/005* (2013.01)

(58) Field of Classification Search
CPC ... G02B 26/004; G02B 26/005; G02F 1/1676; G02F 1/1675; G02F 1/16755; G02F 1/16757
See application file for complete search history.

(56) References Cited

U.S. PATENT DOCUMENTS

| | | | |
|---|---|---|---|
| 9,529,189 B1 | 12/2016 | Langendijk et al. | |
| 10,001,639 B1 | 6/2018 | Guntaka et al. | |
| 10,310,251 B1 * | 6/2019 | Manukyan | G03F 7/0007 |

FOREIGN PATENT DOCUMENTS

| | | |
|---|---|---|
| CN | 101750732 A | 6/2010 |
| CN | 103229098 A | 7/2013 |

(Continued)

OTHER PUBLICATIONS

Yang et al. "Scalable Fabrication and Testing Processes for Three-Layer Multi-Color Segmented Electrowetting Display" Micromachines 2019, 10, 341; doi:10.3390/mi10050341 (Year: 2019).*

(Continued)

*Primary Examiner* — George G. King
(74) *Attorney, Agent, or Firm* — Ware, Fressola, Maguire & Barber LLP

(57) ABSTRACT

A reflective display device and a color laminated display device are disclosed. The reflective display device according to the present application includes: a first electrode which is a transparent electrode; a second electrode arranged opposite to the first electrode; a display layer arranged between an inner side of the first electrode and an inner side of the second electrode; the display layer including a plurality of pixel walls which are arranged in the display layer at intervals; and an accommodating cavity formed by two adjacent pixel walls and the inner side of the second electrode, the accommodating cavity being used for accommo- (Continued)

dating a color developing liquid, and each of the pixel walls has a color identical to the color developing liquid.

10 Claims, 5 Drawing Sheets

(56)                     References Cited

FOREIGN PATENT DOCUMENTS

| CN | 105044904 | A | 11/2015 |
| CN | 116339034 | A | 6/2023 |
| JP | 2005275261 | A | 10/2005 |
| KR | 20080071250 | A | 8/2008 |

OTHER PUBLICATIONS

Yang et al. "Design, Fabrication and Measurement of Full-Color Reflective Electrowetting Displays" Micromachines 2022, 13, 2034. https://doi.org/10.3390/mi13112034 (Year: 2022).*
International Search Report and Written Opinion of corresponding PCT application, PCT/CN2023/134673, dated Mar. 6, 2024, 10 pages.

* cited by examiner

REFLECTIVE DISPLAY DEVICE AND COLOR LAMINATED DISPLAY DEVICE

CROSS-REFERENCE TO RELATED APPLICATIONS

This application is a national stage filing under 35 U.S.C. § 371 of international application number PCT/CN2023/134673, filed Nov. 28, 2023, which claims priority to Chinese patent application No. 2023101894918 filed Mar. 2, 2023. The contents of these applications are incorporated herein by reference in their entirety.

TECHNICAL FIELD

The present application relates to the technical field of display, and more particularly, to a reflective display device and a color laminated display device.

BACKGROUND

Electronic paper is a novel reflective display technology with advantages such as low manufacturing cost, realistic display, low power consumption, making it a research hotspot in recent years. Due to its excellent display performance, electronic paper display technology has great application potentials in information display, status indication, outdoor billboard, and the like.

The electronic paper is characterized in that the screen itself does not emit light, but a display effect is achieved by reflecting external light or light from built-in light sources within the device. It is one of the main ways to realize colorization of the electronic paper by using a laminated reflective display device. Its basic principle involves utilizing the principle of subtractive color mixing to vertically laminate CMY three-color devices, and controlling an absorption ratio of incident and reflected lights by various colors of ink by controlling changes of ink aperture ratios of the display devices in each layer, so as to display various colors. In the devices in each layer, a pixel wall structure must be provided to confine the image display elements. In the existing technology, due to the existence of the pixel walls in the display devices, stray light incident on the pixel walls will be reflected by or transmitted through the pixel walls, thus affecting a color gamut of the reflective display device.

SUMMARY

The following is a summary of the subject matter detailed herein. The summary is not intended to limit the protection scope of the claims.

In order to solve at least one of the above problems, the present application provides a reflective display device and a color laminated display device, which can solve the scattering problem of stray light incident on a pixel wall, thereby improving the color gamut and the contrast ratio of the reflective display device.

According to a first aspect of the present application, a reflective display device is provided, comprising: a first electrode, wherein the first electrode is a transparent electrode; a second electrode arranged opposite to the first electrode; a display layer, wherein the display layer is arranged between an inner side of the first electrode and an inner side of the second electrode; and the display layer comprises a plurality of pixel walls, and the pixel walls are arranged in the display layer at intervals; and an accommodating cavity formed by two adjacent pixel walls and the inner side of the second electrode, wherein the accommodating cavity is used for accommodating a color developing liquid, and each of the pixel walls has a color identical to the color developing liquid.

In the reflective display device according to the first aspect of the present application, due to the fact that the color displayed by the pixel walls is the same as that displayed by the reflective display device, the color of external light passing through the pixel wall becomes the same as that of the reflective display device, so that influences of stray light on contrast ratio, color gamut and visual angle color cast of the reflective display device can be eliminated, thereby improving the color gamut and the contrast ratio of the reflective display device.

In some embodiments, the reflective display device further comprises: a first substrate, wherein the first substrate is arranged on an outer side of the first electrode; a second substrate, wherein the second substrate is arranged on an outer side of the second electrode; and at least one of the first substrate and the second substrate is transparent.

In some embodiments, the display layer is further filled with a polar liquid, the color developing liquid is ink, the ink is immiscible with the polar liquid, and at least one of the first electrode and the second electrode is electrically connected with the ink and the polar liquid.

In some embodiments, the pixel walls are not in contact with the first electrode.

In some embodiments, the second electrode is covered with a hydrophobic film, and the hydrophobic film has a contact angle greater than contact angles of the pixel walls.

In some embodiments, the pixel walls are formed by photoetching and developing.

In some embodiments, the second electrode is a reflective electrode.

In some embodiments, the second electrode is a transparent electrode, and the first substrate and the second substrate are transparent substrates.

According to a second aspect of the present application, a color laminated display device is provided, comprising at least one first reflective display device and one second reflective display device; wherein the at least one first reflective display device is laminated over the second reflective display device;

and wherein the at least one first reflective display device comprises:
a first electrode, wherein the first electrode is a transparent electrode;
a second electrode arranged opposite to the first electrode;
a first display layer, wherein the first display layer is arranged between an inner side of the first electrode and an inner side of the second electrode; and the first display layer comprises a plurality of first pixel walls, and the first pixel walls are arranged in the first display layer at intervals;
a first accommodating cavity formed by two adjacent first pixel walls and the inner side of the second electrode, wherein the first accommodating cavity is used for accommodating a first color developing liquid, and each of the first pixel walls has a color identical to the first color developing liquid;
a first substrate, wherein the first substrate is arranged on an outer side of the first electrode;
a second substrate, wherein the second substrate is arranged on an outer side of the second electrode;

wherein the second electrode is a transparent electrode, and the first substrate and the second substrate are transparent substrates, and wherein the second reflective display device comprises:

a third electrode, wherein the third electrode is a transparent electrode;

a fourth electrode arranged opposite to the third electrode, wherein the fourth electrode is a reflective electrode;

a second display layer, wherein the second display layer is arranged between an inner side of the third electrode and an inner side of the fourth electrode; and the second display layer comprises a plurality of second pixel walls, and the second pixel walls are arranged in the second display layer at intervals; and a second accommodating cavity formed by two adjacent second pixel walls and the inner side of the fourth electrode, wherein the second accommodating cavity is used for accommodating a second color developing liquid, and each of the second pixel walls has a color identical to the second color developing liquid.

In some embodiments, the at least one first reflective display device comprises two first reflective display devices, the two first reflective display devices and the second reflective display device respectively use a yellow color developing liquid, a magenta color developing liquid and a cyan color developing liquid.

It may be understood that, the beneficial effects of the second aspect in comparison to the existing technology are the same as the beneficial effects of the first aspect in comparison to the existing technology, which may refer to the related description in the first aspect and will not be repeated here.

Other features and advantages of the present application will be elaborated in the following description, and will be partially obvious from the description, or may be learned by practice of the present application. The objects and other advantages of the present application may be realized and attained by the structure particularly pointed out in the description, claims, and the appended drawings.

DETAILED DESCRIPTION

Figure 1:
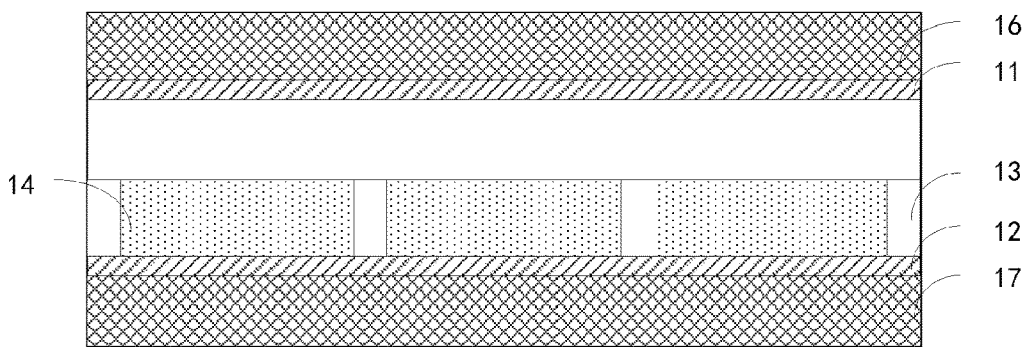
FIG. 1 is a schematic diagram of a known reflective display device.

Embodiments of the present application will be described in detail, the preferred embodiments of the present application are shown in the drawings, the drawings are intended to supplement the description in the written portion of the specification with figures, so that people can intuitively and vividly understand each technical feature and the overall technical solution of the present application, but it shall not be understood as a limitation to the protection scope of the present application.

In the description of the present application, it should be understood that the orientation or positional relationship indicated by the terms upper, lower, front, back, left and right is based on the orientation or positional relationship shown in the drawings, only for the convenience of describing the present application and simplifying the description, and does not indicate or imply that the indicated device or element must have a specific orientation, or be constructed and operated in a specific orientation. Therefore, the terms should not be construed as limiting the present application.

In the description of the present application, the meaning of several refers to be one or more, and the meaning of multiple refers to be two or more. The meanings of greater than, less than, more than, etc., are understood as not including the following number, while the meanings of above, below, within, etc., are understood as including the following number. If first and second are described, the descriptions are used for the purpose of distinguishing the technical features only, and cannot be understood as indicating or implying relative importance, or implicitly indicating the number of technical features indicated thereby, or implicitly indicating the order of technical features indicated thereby.

In the description of the present application, unless otherwise explicitly defined, words such as setting, mounting and connecting should be understood in a broad sense, and those having ordinary skills in the art can reasonably determine the specific meanings of the above words in the present application in combination with the specific contents of the technical solutions.

In addition, in order to show the main technical features of the present application more intuitively, the drawings in the illustration of the present application are exaggerated, and in fact, the proportions and sizes of various components may be inconsistent with those in the illustration. In addition, for the convenience of illustration, the present application omits well-known circuits, housings and supporting structures, and it should be understood that those having ordinary skills in the art can design and set the circuits, housings and supporting structures according to their needs.

As shown in FIG. 1, a reflective display device employing electrowetting in FIG. 1 comprises a pair of first electrode 11 and second electrode 12 which are arranged in opposite, and a display layer of the electrowetting device is accommodated between the first electrode 11 and the second electrode 12. The display layer is filled with a color developing liquid 14, the display layer is divided into various regions by pixel walls 13, and each region obtained by the division can be called a pixel. The reflective device can implement on-off of the pixel by adjusting a position of the color developing liquid 14 in the pixel region. A first substrate 15 and a second substrate 17 for supporting are also provided. For example, when a voltage is applied between the first electrode 11 and the second electrode 12, the color developing liquid 14 will shrink and concentrate in a small region in the pixel, thus increasing transparency of the pixel. On the contrary, when there is no voltage between the first electrode 11 and the second electrode 12 or the voltage is small, the color developing liquid 14 will spread out, thereby make the pixel have the color of the color developing liquid 14.

Figure 2:
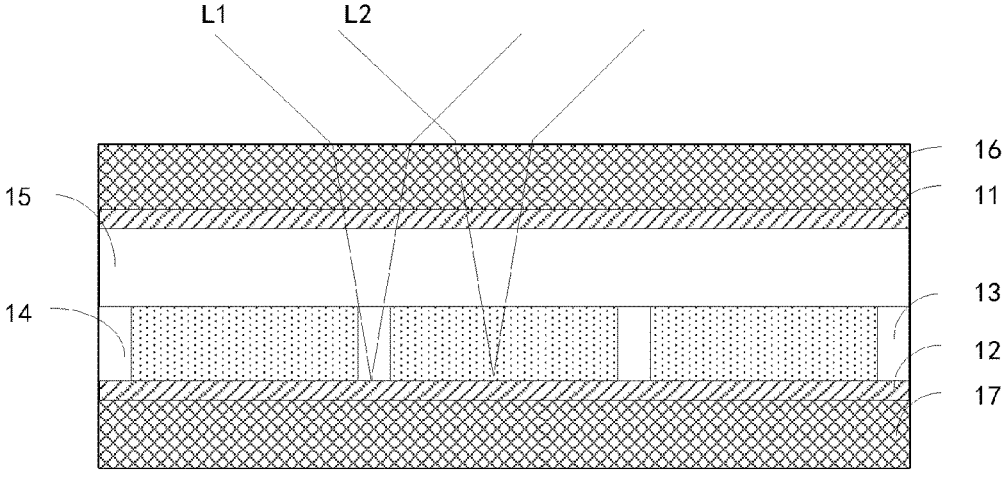
FIG. 2 is a schematic diagram of light propagation in the known reflective display device.

A traditional pixel wall 13 is made of colorless and transparent material. In this case, as shown in FIG. 2, when the white light L1 from the outside enters the pixel wall 13 and reflected by the second electrode 12, it is still white light. The while white light L2 is reflected by the spread-out color developing liquid 14 and becomes the light with the same color as the color developing liquid 14. In this case, because the light with two different colors is reflected, the color purity of the emitted light is reduced. In addition, because the white light absorbed by the pixel wall 13 enters the reflective device at different angles, the energy is also different, thus causing visual angle color cast.

Figure 3:
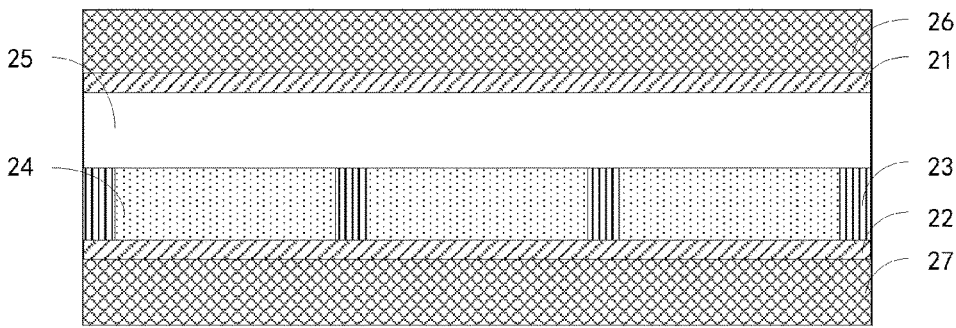
FIG. 3 is a schematic diagram of a reflective display device according to an embodiment of the present application.

In order to solve the above problems, as shown in FIG. 3, the present application provides a reflective display device, comprising: a first electrode 21, wherein the first electrode 21 is a transparent electrode; a second electrode 22 arranged opposite to the first electrode 21; a display layer, wherein the display layer is arranged between an inner side of the first electrode 21 and an inner side of the second electrode 22; and the display layer comprises a plurality of pixel walls 23, and the pixel walls 23 are arranged in the display layer at intervals; and an accommodating cavity formed by two adjacent pixel walls 23 and the inner side of the second electrode 22, wherein the accommodating cavity is used for accommodating a color developing liquid 24, and each of the pixel walls 23 has a color identical to the color developing liquid 24.

In the reflective display device of the present application, due to the fact that the color displayed by the pixel walls 23 is the same as that displayed by the reflective display device, the color of external light passing through the pixel wall 23 becomes the same as that of the pixel wall 23, so that influences of stray light on contrast ratio, color gamut and visual angle color cast of the reflective display device can be eliminated, thereby improving the color gamut and the contrast ratio of the reflective display device.

It is easy to understand that when the reflective display device of the present application is used as a display screen alone, for example, when the color developing liquid 24 is black, the pixel walls 23 will absorb the stray light, increasing the contrast ratio of the reflective display device.

In some embodiments, with reference to FIG. 3, the reflective display device of the present application further comprises a first substrate 26, wherein the first substrate 26 is arranged on an outer side of the first electrode 21; a second substrate 27, wherein the second substrate 27 is arranged on an outer side of the second electrode 22; and at least one of the first substrate 26 and the second substrate 27 is transparent. The substrates can provide strong support when the reflective display device is laminated or embedded in other devices.

In some embodiments, the substrates may not be used, for example, the first substrate 26 and the first electrode 21 are integrated. In this case, only a plastic member with the first electrode 21 embedded is needed to realize the lamination without the first substrate 26. Alternatively, in the color laminated device described later, the reflective display device at the lowest layer can complete its due function without the second substrate 27.

Referring to FIG. 3, in some embodiments, the display layer is further filled with a polar liquid 25, the color developing liquid 24 is ink, the ink is immiscible with the polar liquid 25, and at least one of the first electrode 21 and the second electrode 22 is electrically insulated from the ink and the polar liquid 25, so that a potential difference can be ensured between the first electrode 21 and the second electrode 22.

However, in some embodiments, the color developing liquid 24 may be a colored electrolyte solution.

Illustratively, a voltage can be applied through the first electrode 21 and the second electrode 22 to control the aperture ratio of the ink. The aperture ratio is a value representing the size of a light-transmitting area of the pixel due to ink shrinkage. The greater the aperture ratio is, the smaller the ink shrinkage in the pixel will be. It is appreciated that the larger the aperture ratio is, the more light the pixel can transmit, which makes reflectivity of the reflective display device higher.

In some embodiments, the second electrode 22 is provided with a hydrophobic film or a hydrophobic layer is added between the color developing liquid 24 and the second electrode 22. However, it is easy to understand that in some embodiments, the color developing liquid 24 can be shrunk to a corner of the pixel even without using the hydrophobic film but holding the device and applying a voltage for a long time.

The pixel walls 23 of the present application can be formed by photoetching and developing or by thermal curing of resin, without limitation to the assembly process and the manufacturing process. For example, a layer of photoresist is coated on an inner side of the second electrode 22, and a pigment with the same color as that of the color developing liquid 24 is added to the photoresist, and then cured by using the photolithographic technology for curing, to prepare the pixel walls 23. Alternatively, a resin doped with the pigment with the same color as that of the color developing liquid 24 is used to thermally cure the region of the pixel walls 23, and then the pixel walls 23 are prepared by drilling, grinding and cutting.

The transparent first electrode 21 or the transparent second electrode 22 may be formed, for example, by using indium tin oxide (ITO), zinc oxide (ZnO), stannic oxide (SnO) and other common film forming methods such as sputtering, vacuum deposition and Chemical Vapor Deposition (CVD).

In some embodiments, the first electrode 21 and the second electrode 22 may be composed of, for example, more than one needle-like electrode, mesh-like electrode, and the like, arranged in the ink, in addition to the surface electrode shown in FIG. 3.

The technical solutions of the present application will be described hereinafter.

Embodiment 1

Figure 4:
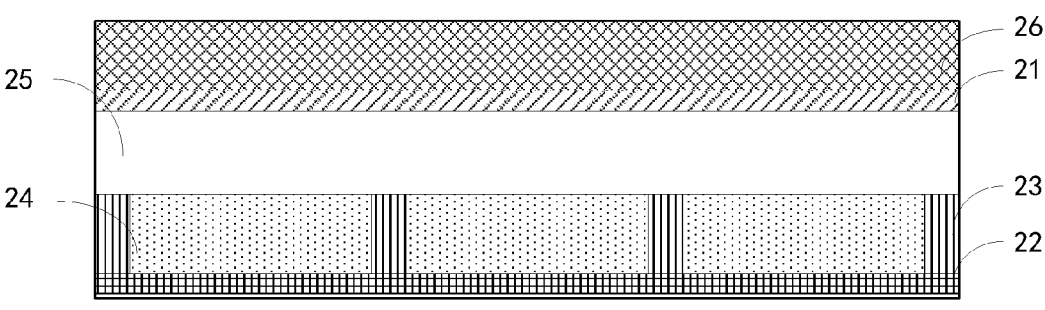
FIG. 4 is a schematic diagram of a reflective display device according to another embodiment of the present application.

With reference to FIG. 4, FIG. 4 is a reflective display device according to an embodiment of the present application, comprising a pair of first electrode 21 and second electrode 22 which are arranged in opposite. A polar liquid 25 is filled between the first electrode 21 and the second electrode 22, and a plurality of pixel walls 23 are arranged on the second electrode 22 at intervals, so that two adjacent pixel walls 23 and the second electrode 22 form an accommodating cavity, and ink as a color developing liquid 24 is accommodated in the accommodating cavity. Each of the pixel walls 23 has a color identical to the color developing liquid 24. A hydrophobic film (not shown in the figure) is provided on the second electrode 22 to insulate the second electrode 22 from the color developing liquid 24 and the polar liquid 25. The second electrode 22 is a reflective electrode and can reflect light from the outside.

Figure 5:
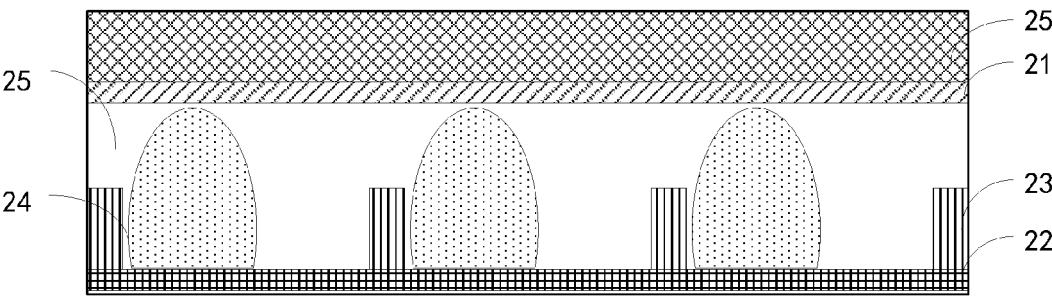
FIG. 5 is a schematic diagram of an ink shrinkage state of the reflective display device according to an embodiment of the present application.

With reference to FIG. 5, when a voltage is applied between the first electrode 21 and the second electrode 22, the color developing liquid 24 shrinks in a corner between the two pixel walls 23, so that the reflective display device is turned on, and from the outside, the reflective display device appears white.

With reference to FIG. 4, when the color developing liquid 24 is spread-out, because the light passing through the pixel wall 23 also becomes the same color as the ink in a pixel display region, compared with the common reflective display device, the reflective display device according to an embodiment of the present application reduces the amount of external white light, that is, improves the color gamut of the display device.

The reflective display device of this embodiment may be filled with black ink, and may be used as an independent reflective display device alone, or used as the lowest layer of a color laminated display device described later.

Embodiment 2

Figure 6:
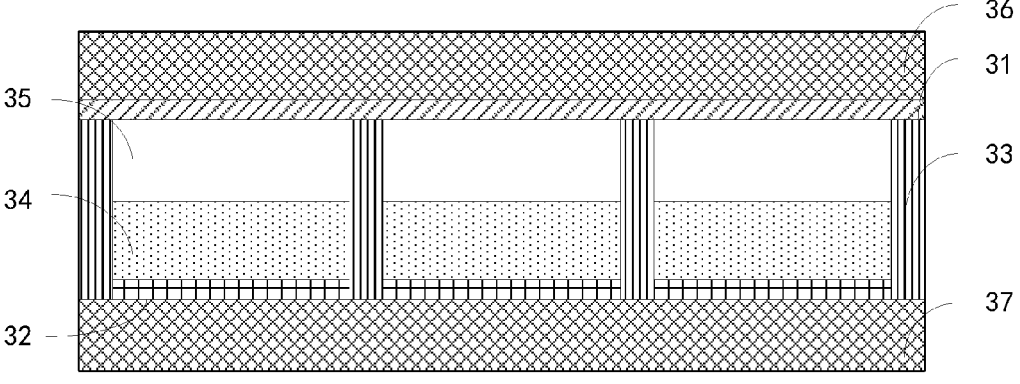
FIG. 6 is a schematic diagram of a reflective display device according to another embodiment of the present application.

With reference to FIG. 6, FIG. 6 is a reflective display device according to an embodiment of the present application, comprising a first electrode 31 and a plurality of second electrodes 32 arranged in opposite, wherein the first electrode 31 is a transparent electrode, the second electrode 32 is a reflective electrode, and the second electrodes 32 between different pixels are not communicated. A pair of first substrate 36 and second substrate 37 which are transparent are arranged on outer sides of the first electrode 31 and the second electrodes 32, and a display layer is arranged between the first electrode 31 and the second electrodes 32. Pixel walls 33 extend from the second electrodes 32 to the first electrode 31, dividing the pixel into small capsules one after another. A capsule wall is composed of the first electrode 31, the second electrode 32 and two adjacent pixel walls 33. Each capsule contains ink 34 and a polar liquid 35, and the rest is the same as that in Embodiment 1.

Similar to Embodiment 1, the capsules can be opened and closed one after another by applying a voltage. Although cost and processing difficulty of the capsule design are higher, the capsules can be designed in different shapes to meet color arrangement (for example, RGB arrangement), and color display can be realized through reflection by filling different colors of ink 34 and electrodes that can be controlled separately. In this case, color display can be completed without lamination.

In this embodiment, the capsule wall is set to the same color as the ink 34. In some embodiments, in order to increase the bearing capacity of the capsule wall, the capsule wall is not formed by development using photoresist, but is formed by thermal curing of polyester resin.

In some embodiments, the second electrodes are transparent electrodes, so the reflective display device of Embodiment 2 can be used as one layer of a color laminated display device described later to complete color display.

Embodiment 3

Figure 7:
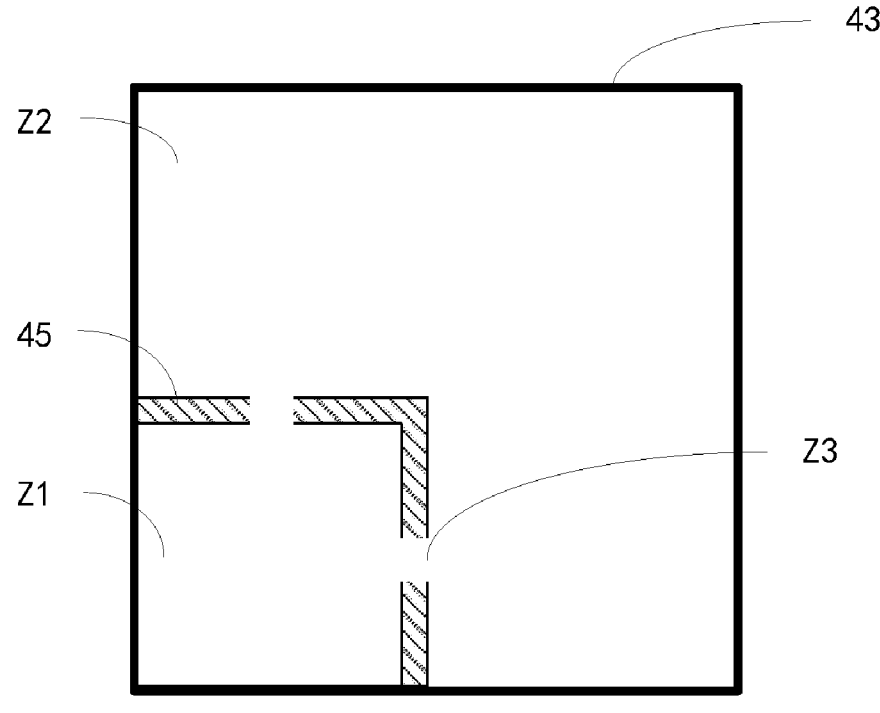
FIG. 7 is a top view of a pixel according to an embodiment of the present application.
Figure 8:
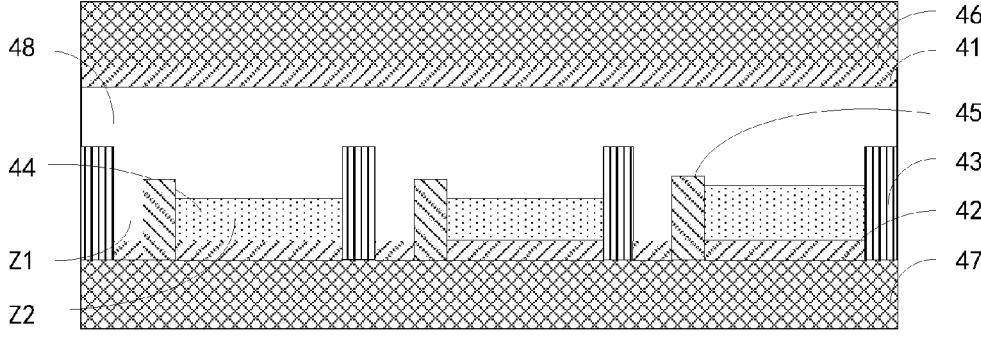
FIG. 8 is a schematic diagram of a reflective display device according to another embodiment of the present application.

With reference to FIG. 7, FIG. 7 is a top view of a display layer of a reflective display device according to an embodiment of the present application, and FIG. 8 is a schematic diagram of a reflective display device according to an embodiment of the present application.

In the embodiment of FIG. 8, with reference to FIG. 6, FIG. 6 is a reflective display device of an embodiment of the present application, comprising a pair of transparent electrodes, which are a first electrode 41 and a second electrode 42 arranged in opposite. A transparent first substrate 46 and a transparent second substrate 47 are arranged on outer sides of the first electrode 41 and the second electrode 42 respectively. Pixel walls 43 are arranged on the second electrode 42 at intervals, ink 44 is contained between adjacent pixel walls 43 and fences 45 are arranged, and the fences 45 and the pixel walls 43 have the same color as that of the ink 44. The second electrode 42 is composed of a plurality of discontinuous electrodes. Specifically, one pixel surrounded by the pixel wall is divided into a first region Z1 and a second region Z2 by the fence 45. The second electrode 42 is formed into several parts at the first regions Z1 and the second regions Z2 which are spaced apart. A hydrophobic film (not shown) is provided on the second electrode 42, and a contact angle between the pixel wall 43 and the fence 45 is greater than that of the second electrode 42 (or the hydrophobic film on the second electrode 42). A size of the contact angle reflects hydrophilicity of a material surface.

The pixel walls 43 and the fences 45 are both set to have the same color as that of the ink.

The exemplary hydrophobic film may be made of insulating materials such as polyimide resin, SiO2, SiN4, propylene resin, perylene, chlorine resin, polyamide resin, polyethylene terephthalate, polypropylene, polystyrene, silicone resin, quartz, epoxy resin, polyethylene, polytetrachloroethylene, or the like, and may also be made of materials through which a small amount of current flows.

With reference to FIG. 8, the composition of the first region Z1 and the second region Z2 can be seen from the top view. The fence 45 is provided with a plurality of gaps Z3 at an interval.

It is appreciated that when a voltage is applied to one of the first zone Z1 and the second zone Z2 while no voltage is applied to the other zone, the ink will cross the fence through the gaps Z3 and enter the region where the voltage is applied. When the voltage is no longer applied, the ink will be kept in place to obtain storability of the ink 44.

Although it is illustrated in the figure that the gaps of the fence 45 are oriented in a longitudinal direction (from the first electrode 42 to the second electrode 41), the gaps may be arranged as transverse pores.

In addition, in FIG. 7, the fence 45 is rectangular, but it is easy to get that no matter what shape the fence is, a holding function of the fence will not be affected. In some embodiments, the fence 45 is set in a quarter-arc shape, and a plurality of gaps Z3 are set at the arc.

The reflective display device of Embodiment 3 may also be used as one layer of a color laminated device described later in the present application. In some embodiments, the second electrode 42 of Embodiment 3 is a reflective electrode, or provided with a reflective layer, which may also be used as a separate reflective display device.

Embodiment 4

Figure 9:
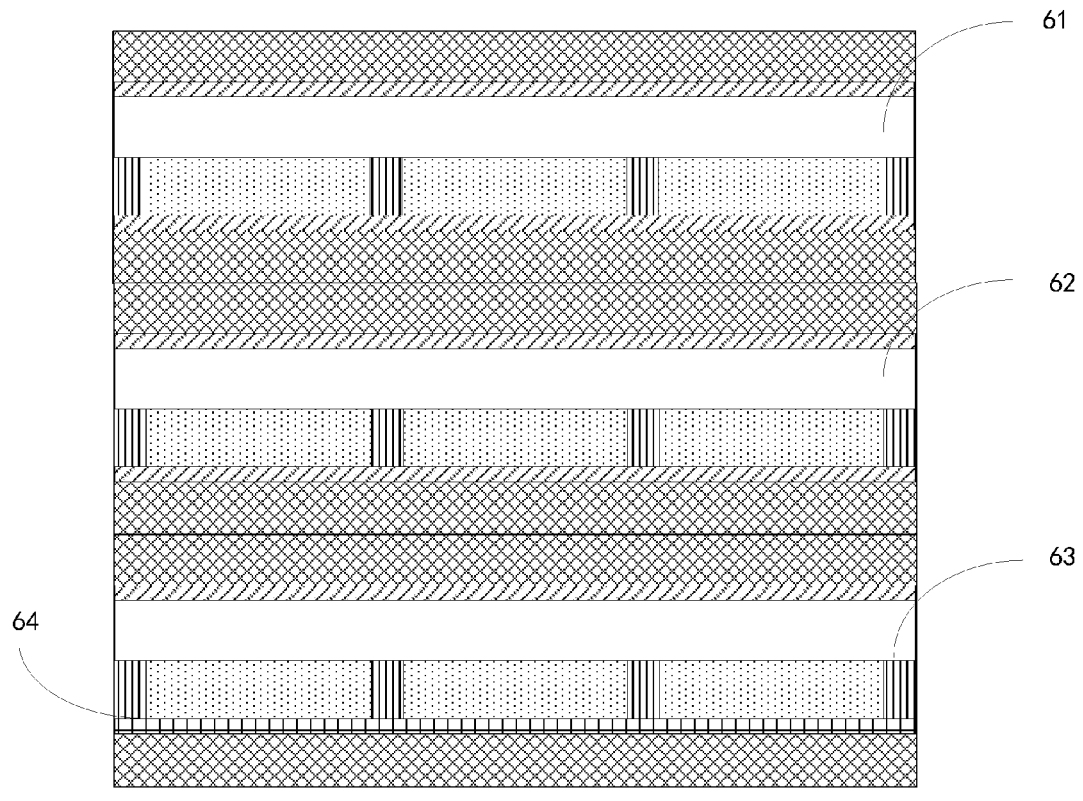
FIG. 9 is a schematic diagram of a color laminated display device according to an embodiment of the present application.

FIG. 9 is a schematic diagram of a color laminated display device according to an embodiment of the present application. An uppermost reflective display device 61 containing two transparent electrodes and an intermediate reflective display device 62 are comprised and a bottom reflective display device 63 with one reflective electrode is provided.

The color laminated display device of FIG. 9 is composed of three layers of reflective display devices, wherein colors of ink or corresponding color developing liquids used by each reflective display device are different, and generally, three layers (C, M and Y) may be laminated. For example, the uppermost reflective display device 61 employs yellow (Y), the middle reflective display device 62 employs magenta (M), and the bottom reflective display device 63 employs cyan (C). In each layer of reflective display device, the aperture ratio of ink can be changed by controlling the voltage applied to the respective electrodes, so as to control the proportion of light absorbed by the device in each layer with different colors, thereby realizing color display.

In the Embodiment of FIG. 9, the color of the pixel walls of each reflective display device is the same as the color of the ink contained within the pixel walls.

When the color laminated display device needs to display black, the ink of the reflective display device in each layer is completely closed (the ink is completely spread) by adjusting the voltage. External white light is absorbed after passing through the three layers of ink (C, M and Y), and the ink region displays a black picture. The white light is all absorbed after passing through the three layers of pixel walls. Therefore, the contrast ratio of the color laminated display device is improved.

When the color laminated device needs to display a certain color, at least one layer of reflective display device is in an open state (the ink shrinks) by adjusting the voltages across the first electrode and the second electrode of the reflective display devices in each layer, and the white light incident from the outside is reflected by the ink layer in the closed state and the bottom reflective electrode and emitted to display a certain color. In this case, the white light passing through the pixel walls will still be absorbed by the pixel walls, and will not be mixed into the emitted light, thus improving the color gamut and avoiding visual angle color cast.

In this embodiment, the reflective display devices in the color laminated device may be any one of Embodiment 1, Embodiment 2 and Embodiment 3 or any variant thereof in addition to the illustrated structure. It is appreciated that if the bottom reflective display device 63 is used, the second electrode 64 should be a reflective electrode. Moreover, the uppermost reflective display device or the intermediate reflective display device needs to comprise a transparent first electrode and a transparent second electrode. It should be noted that the first electrode and the second electrode in the present application may be arranged continuously or discontinuously.

In some embodiments, additional circuits may be added so that the color developing liquid 24 in a single pixel can be controlled separately.

Comparative Example 1

Figure 10:
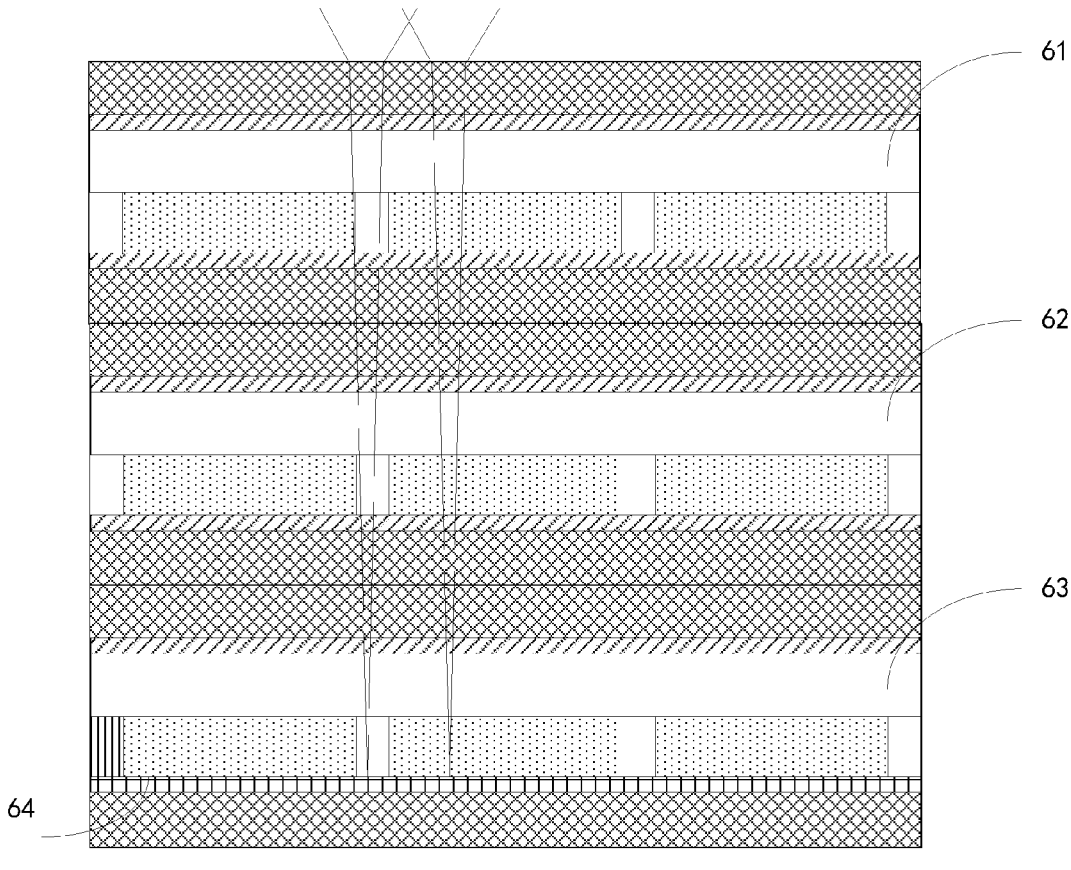
FIG. 10 is a schematic diagram of a color laminated display device according to the existing technology.

FIG. 10 is a schematic diagram of a color laminated display device according to the comparative example. The color laminated display device is composed of three layers of reflective display devices arranged in CMY, comprising an uppermost reflective display device 61 containing two transparent electrodes and an intermediate reflective display device 62, and a bottom reflective display device 63 with one reflective electrode. The pixel walls of each reflective display device are made of transparent photoresist.

When the color laminated display device displays a black picture, the aperture ratios of the reflective display devices in each layer are minimized, the ink is completely spread, and most of the light entering the color laminated display device is absorbed. When the external white light enters the color laminated display device, the external white light is absorbed after passing through the three layers of ink (C, M and Y), and the ink region displays a black picture. However, the pixel walls are transparent, and the external white light is still white after passing through the pixel walls of the three layers of devices, and then reflected by the reflective electrode of the bottom device, and then emitted from the first substrate of the uppermost reflective display device 61 into the air. Therefore, the white light emitted through the pixel walls will increase the brightness of the whole black picture, thus reducing the contrast ratio of the color laminated display device.

When the color laminated display device displays a certain color, it is necessary to adjust the voltages across the first electrodes and the second electrodes of the reflective display devices in each layer, so that at least one layer of reflective display device is in an on state. The external white light transmits through the pixel wall region completely, and then the white light is reflected by the bottom reflective electrode, and emitted into the air from a glass substrate of the uppermost device. The white light is mixed with the emitted light for displaying, which will reduce the color purity of the emitted light, thus reducing the color gamut of the whole device.

Through the comparison of Comparative Example 1, it can be shown that the color laminated display device of Embodiment 4 has better contrast ratio, and will not reduce the color gamut and cause visual angle color cast.

All the above embodiments can be implemented using the existing processes.

It is easy to understand that the reflective display device and the color laminated display device of the present application can be applied to all types of electronic devices that need display, such as electronic paper books, displays, electronic billboards, electronic labels, and the like. When these devices are implemented, it is possible to make some variations to the present application, such as setting the reflective display device of the present application to be curved, or sizes and materials of parts and components are different from the present application. None of these variations will change the inventive idea and subject matter of the present application. Therefore, these variations do not deviate from the protection scope of the present application.

Although Embodiment 4 described above uses a three-layer laminated CMY architecture, in some embodiments, a two-color display formed by laminating two reflective display devices may also be used. In this embodiment, one first reflective display device provided with a reflective electrode and one second reflective display device arranged on the first reflective display device and provided with two transparent electrodes are comprised. The first reflective display device is equivalent to the bottom reflective display device 63 in Embodiment 4, and the second reflective display device is equivalent to the middle reflective display device 62 or the uppermost reflective display device 61 in Embodiment 4.

When being applied to a terminal device, a controller connected to a chip may be used to control the aperture ratio of the ink in the pixel of each layer, and different images and colors can be combined through subtractive color mixing, thus realizing a display function.

In the description of the specification, the description with reference to the terms "one embodiment", "some embodiments", "illustrative embodiments", "examples", "specific examples" or "some examples" mean that the specific features, structures, materials or characteristics described in connection with this embodiment or example are included in at least one embodiment or example of the present application. In the specification, the schematic representation of the above terms does not necessarily mean the same embodiment or example. Moreover, the specific features, structures, materials or characteristics described may be combined in any one or more embodiments or examples in a suitable manner.

The embodiments of the present application are described in detail with reference to the drawings above, but the present application is not limited to the above embodiments, and various changes may also be made within the knowledge scope of those of ordinary skills in the art without departing from the purpose of the present application.

What is claimed is:

1. A reflective display device, comprising:
a first electrode, wherein the first electrode is a transparent electrode;
a second electrode arranged opposite to the first electrode;
a display layer, wherein the display layer is arranged between an inner side of the first electrode and an inner side of the second electrode; and the display layer comprises a plurality of pixel walls, and the pixel walls are arranged in the display layer at intervals; and
an accommodating cavity formed by two adjacent pixel walls and the inner side of the second electrode, wherein the accommodating cavity is used for accommodating a color developing liquid, and each of the pixel walls has a color identical to the color developing liquid.

2. The reflective display device according to claim 1, further comprising:
a first substrate, wherein the first substrate is arranged on an outer side of the first electrode;
a second substrate, wherein the second substrate is arranged on an outer side of the second electrode; and
wherein at least one of the first substrate and the second substrate is transparent.

3. The reflective display device according to claim 1, wherein the display layer is further filled with a polar liquid, the color developing liquid is ink, the ink is immiscible with the polar liquid, and at least one of the first electrode and the second electrode is electrically connected with the ink and the polar liquid.

4. The reflective display device according to claim 1, wherein the pixel walls are not in contact with the first electrode.

5. The reflective display device according to claim 1, wherein the second electrode is covered with a hydrophobic film, and the hydrophobic film has a contact angle greater than contact angles of the pixel walls.

6. The reflective display device according to claim 1, wherein the pixel walls are formed by photoetching and developing.

7. The reflective display device according to claim 1, wherein the second electrode is a reflective electrode.

8. The reflective display device according to claim 2, wherein the second electrode is a transparent electrode, and the first substrate and the second substrate are transparent substrates.

9. A color laminated display device, comprising at least one first reflective display device and one second reflective display device; wherein the at least one first reflective display device is laminated over the second reflective display device;
wherein the at least one first reflective display device comprises:
a first electrode, wherein the first electrode is a transparent electrode;
a second electrode arranged opposite to the first electrode;
a first display layer, wherein the first display layer is arranged between an inner side of the first electrode and an inner side of the second electrode; and the first display layer comprises a plurality of first pixel walls, and the first pixel walls are arranged in the first display layer at intervals;
a first accommodating cavity formed by two adjacent first pixel walls and the inner side of the second electrode, wherein the first accommodating cavity is used for accommodating a first color developing liquid, and each of the first pixel walls has a color identical to the first color developing liquid;
a first substrate, wherein the first substrate is arranged on an outer side of the first electrode:
a second substrate, wherein the second substrate is arranged on an outer side of the second electrode;
wherein the second electrode is a transparent electrode, and the first substrate and the second substrate are transparent substrates, and
wherein the second reflective display device comprises:
a third electrode, wherein the third electrode is a transparent electrode;
a fourth electrode arranged opposite to the third electrode, wherein the fourth electrode is a reflective electrode;
a second display layer, wherein the second display layer is arranged between an inner side of the third electrode and an inner side of the fourth electrode; and the second display layer comprises a plurality of second pixel walls, and the second pixel walls are arranged in the second display layer at intervals; and
a second accommodating cavity formed by two adjacent second pixel walls and the inner side of the fourth electrode, wherein the second accommodating cavity is used for accommodating a second color developing liquid, and each of the second pixel walls has a color identical to the second color developing liquid.

10. The color laminated display device according to claim 9, wherein the at least one first reflective display device comprises two first reflective display devices, the two first reflective display devices and the second reflective display device respectively use a yellow color developing liquid, a magenta color developing liquid and a cyan color developing liquid.

* * * * *